United States Patent Office 3,376,262
Patented Apr. 2, 1968

3,376,262
PHENOL-FORMALDEHYDE RESIN MODIFIED WITH TETRALIN HYDROPEROXIDE AND TETRALONE
Joseph Z. Pasky, Oakland, Calif., assignor to Chevron Research Company, San Francisco, Calif., a corporation of Delaware
No Drawing. Continuation-in-part of application Ser. No. 413,634, Nov. 24, 1964. This application July 10, 1967, Ser. No. 652,023
10 Claims. (Cl. 260—59)

ABSTRACT OF THE DISCLOSURE

Phenol-formaldehyde derived bonding resins are modified by adding a minor amount of tetralin hydroperoxide, tetralone or mixtures thereof. Molded objects prepared by the use of these modified resins have impact strengths which exceed those of the conventional resins by as much as a factor of 8.

Cross references

This application is a continuation-in-part of application Ser. No. 413,634, filed Nov. 24, 1964.

This invention relates to improved bonding resins. It relates to modified phenol-formaldehyde polymers useful for the preparation of bonding resins which yield in use bonded wood products having greatly improved impact strengths. More particularly, it relates to the preparation of novel modified phenol-formaldehyde polymers obtained by the addition of a minor amount of tetralin hydroperoxide, tetralone or mixtures thereof to the polymerization reaction mixture.

In the production of molded objects using thermosetting phenol-formaldehyde bonding resins, it is known to add fillers such as fibers and the like to improve the strength of the resulting object. On the other hand, the nature of the conventional resin per se is clearly a limiting factor. An object herein is to produce a resin of improved bonding quality. This and other considerations are set forth in the following disclosure.

It has now been found that improved phenol-formaldehyde polymers useful for the production of two-stage thermosetting phenol-formaldehyde bonding resins are produced by adding in the preparation of the first stage phenol-formaldehyde polymer for each part by weight of phenol plus formaldehyde, from about 0.05 to 0.54 part of a modifier selected from the group consisting of tetralin hydroperoxide, $\alpha$-tetralone, tetralin hydroperoxide-$\alpha$-tetralone mixtures having from about 0.5 to 5.0 mols of tetralin peroxide per mol of $\alpha$-tetralone, and concentrated tetralin partial oxidate mixtures. Under acidic conditions the above modifiers are incorporated into the phenol-formaldehyde polymer yielding an intermediate fusible polymer from which excellent wood bonding resins can be prepared. Molded wood and wood-like products prepared by bonding wood flour and the like materials with these modified resins have impact strengths substantially higher than those obtained from the conventional resins, for example, higher by as much as a factor of about 8.

In accordance with the present invention, fusible, soluble phenol-formaldehyde polymers are prepared in general in the manner customary to the art. In the preferred embodiment in which the first stage polymer is prepared by the acid catalyzed reaction of phenol, and formaldehyde, the reactants plus the modifier are mixed and the polymerization carried out, e.g., a novolak-type preparation. Suitable modified phenol-formaldehyde polymers can also be prepared by adding the instant modifiers after the first stage polymerization. In this case fusible phenol-formaldehyde polymers in general are useful, e.g., whether obtained as a novolak- or resole-type preparation. In the latter, of course, acidification of the mixture by a novolak-type acid catalyst is required for the modification.

The modified polymers are useful for molding applications. That is, they melt and flow, taking the shape of their containers as is necessary in molding applications. By mixing modified polymer with a source of additional formaldehyde, i.e., with a curing agent, a bonding resin mixture is formed, which upon heating to about the melting point further polymerizes, i.e., a second stage, to give as a product, an infusible and insoluble thermoset resin. For many uses an inert filler is incorporated into the bonding resin mixture, as by mixing, and the entire mass subjected to heat, thereby forming a filled thermoset resin. It is an object of the present invention to improve the impact strength of filled or unfilled phenol-formaldehyde thermoset resins.

Phenol-formaldehyde novolak polymers are well known in the art. In general, these polymers are prepared (cf. The Chemistry of Phenolic Resins by Robert W. Martin, John Wiley (1956), p. 112) by the reaction of one mole of phenol with less than one mole of formaldehyde in an acid-catalyzed reaction. More particularly, polymers are prepared using about 10 moles of phenol and from about 4 to 9 moles of formaldehyde. The formaldehyde for this reaction may be either dry or in aqueous solution. The latter method is preferred. After polymerization is completed, the polymer is separated from any supernatant water present and dried by heating above 100° C. At this temperature, the material is a liquid which solidifies upon cooling. Usually the resulting solid polymer is broken up and crushed to form a powder.

In the preferred embodiment of the present invention, the novolak procedure is followed except that a tetralin-free partially oxidized tetralin mixture is included in the first stage polymerization step.

The modifier compositions of the present invention consist of the various partial oxidation products of tetralin. Thus tetralin hydroperoxide, $\alpha$-tetralone, and tetralin-free partial oxidates of tetralin, and mixtures thereof, are all useful modifiers suitable for the production of improved thermosetting bonding resins.

By tetralin-free partial oxidates of tetralin is meant the product obtained by liquid phase air or oxygen oxidation of tetralin effected below the decomposition temperature of tetralin hydroperoxide at a conversion below about 75 percent and from which substantially all of the unconverted tetralin has been removed, for example, as by a reduced pressure fractionation.

Minor amounts of tetralin (5–10 weight percent based upon total concentrated oxidate mixture) can be present in the oxidate without particular prejudice to the results desired herein.

In general where the conversion of tetralin in the air oxidation is limited to the 25–30 mol percent range, the partial oxidate is predominantly tetralin hydroperoxide. At increasingly higher conversion levels, $\alpha$-tetralone becomes a substantial component, e.g., the mol ratio of the tetralin hydroperoxide to $\alpha$-tetralone in the oxidate decreases as the conversion increases. At 40 mol percent conversion the ratio is 2:1, respectively. Hence by varying the degree of conversion of tetralin, a useful range of tetralin hydroperoxide-$\alpha$-tetralone mixtures are available for use herein. These mixtures are, in general, superior relative to either pure tetralin hydroperoxide or pure $\alpha$-tetralone as modifiers for fusible phenol-formaldehyde polymers. On the other hand the pure compounds per se yield modified phenol-formaldehyde polymers, which are substantially superior to the conventional polymers, provided, and this applies to the mixtures also, the relative amounts used in the modifying are within a limited range.

Surprisingly, the modifying effect of mixtures of α-tetralone and tetralin hydroperoxide, and particularly roughly equivalent mole ratios thereof, exhibit substantially more than a mere additive effect. Still more surprising is the fact that tetralin-free concentrates of the partially air or oxygen oxidized tetralin, containing mainly the above noted ketone and peroxide, are also effective. Thus, minor amounts of the corresponding α,α'-diperoxide and ketone oxidation by-products which are normally produced in the aforedescribed oxidation of tetralin, can be tolerated and are probably beneficial. Costly purifications are thus made unnecessary or undesirable.

The relative amount of modifier which can be added as described herein and yield superior molding resins depends in general upon the mole ratio of phenol to formaldehyde used to prepare the first stage polymer and to the modifier employed. Based upon the total weight of the first stage polymer and modifier, at least about 5 weight percent of modifier is required. When too much modifier is added, the resulting polymer yields molding resins which are unsatisfactory and in fact inferior to conventional resins. Usually too much is of the order of 50 weight percent. Preferably the relative amount of added modifier is in the range 5 to 30 weight percent.

In the use of the instant modified phenol-formaldehyde polymers for the production of bonding resins, as is likewise the case where conventional polymers are used, e.g., unmodified phenol-formaldehyde polymers, a curing agent, usually a source of additional formaldehyde, is added. The added formaldehyde is usually in the form of paraformaldehyde, trioxane, or other forms of solid formaldehyde. Most conveniently, both the polymer and the solid formaldehyde are ground to finely divided powder and mechanically mixed. The resulting mixture is called a molding powder or a thermosetting bonding resin mixture. It is cured or set by heating it above the melting point of the mixture for a short time.

For satisfactory curing of bonding resins, the amount of curing agent used in preparing the bonding resin mixture should be within a particular range. Based upon the cured resin, the mole ratio of formaldehyde to phenol used therein should be greater than 1, preferably greater than 1.5, and usually in the range of 1.5 to 2.5. On a weight basis, the quantity of formaldehyde needed to effect curing depends on the ratio of phenol to formaldehyde in the first stage polymer. For polymers having a relatively low ratio of formaldehyde to phenol, from 0.3 to 0.7 part of formaldehyde per part of polymer is required; whereas, for the more common, high formaldehyde to phenol ratio polymers, from 0.05 to 0.50 part of formaldehyde per part of polymer is necessary.

A particularly preferred curing agent for the instant modified polymers is hexamethylenetetramine (hexa), the reaction product of ammonia and formaldehyde. When hexamethylenetetramine is employed as the curing agent, from about 0.1 to 0.3, preferably 0.15, part of it is needed per part of novolak polymer having a formaldehyde to phenol ratio of 0.85 to 1. For lower ratio polymers, more hexamethylenetetramine would be required, i.e., up to about 0.6 part per part of polymer.

In addition to the above curing agents and for many molding applications as where wood and wood-like materials are bonded or used as extenders, fillers are also added to the resin mixture. Usually these fillers are cellulose derivatives such as wood flour, walnut shell flour, cottonseed hulls, cotton flock, sisal fibers, chopped paper, pulp preforms, etc. Fillers not only extend the molding powder but also facilitate the molding process and impart additional strength properties to the final thermoset product. Usually the fillers are added to the modified polymer along with the curing agent, but this is a matter of convenience only, since they may be incorporated into the mixture at any time before curing.

The amount of filler to be employed in making filled phenol-formaldehyde molding powders varies, depending on the nature of the filler and the end use application. Generally, however, the molding powder or the thermosetting bonding resin mixture is combined with about an equal weight of filler. Satisfactory high strength objects can be prepared with filler concentrations as high as 70 percent by weight, although molding operations tend to become more difficult at these levels. At filler concentrations much below 50 percent the impact strength of the molded product decreases to approximately that of the resin per se. For best all around use the quantity of filler should be in the range of 40 percent to 60 percent by weight, based on the combined weight of novolak polymer and curing agent.

The following examples are illustrative of various aspects of the subject invention. Variations can be made, of course, and should be understood to be within the intended scope of the invention in view of the above disclosure and succeeding comments and claims.

Example 1.—Preparation of a phenol-formaldehyde novolak polymer 1300 parts of phenol (13.8 mols), 130 parts of water, 1145 parts of 30 percent aqueous formaldehyde (11.45 mols), and 6.5 parts of oxalic acid crystals were mixed together in a reactor. The mixture was heated to its boiling point and refluxed for 60 minutes. Then 34.7 parts of 15 percent hydrochloric acid, corresponding to 0.4 percent of 100 percent HCl on the weight of the phenol, was slowly added. The reaction mixture was refluxed for another 35 minutes. At the end of this time, 400 parts of cold water was introduced and the reaction mixture cooled to about 75° C. The crude novolak polymer was allowed to settle for 30 minutes. After removal of the supernatant layer of water, the polymer was dehydrated by heating. As soon as the polymer was clear at 100° C., sodium hydroxide solution of 36 percent concentration was added to neutralize the acids present. Concentrating was continued until the pot temperature reached 115° C. Upon cooling, the polymer solidified and was ground up into a fine powder.

Example 2.—Preparation of a tetralin partial oxidate

Approximately 800 ml. of distilled tetralin was placed in a 1-liter turbostirrer equipped with a stirrer, gas inlet tube, and condenser. Gases leaving the condenser passed through a wet ice trap, Dry Ice trap, and then through a rotometer. Oxygen was metered into the reactor at a rate of 740 cc./minute. The reaction was run at 110–112° C. for 3 hours (the heat of reaction was generally great enough to maintain this temperature without additional heat). The product (38–40 percent peroxide) was stripped of tetralin by heating under vacuum. The resulting crude reaction product (after tetralin removal) contained 68 percent peroxide. This calculates as a peroxide-to-ketone mol ratio of about 2:1.

Example 3.—Preparation of modified novolak polymers

Modified polymers were prepared from phenol, aqueous 30 percent formaldehyde and a modifier by the procedure of Example 1. The reactant quantities used and the nature of the modifier are given in the following table:

| Ex. No. | Modifier | Modifier (grams) | Phenol (grams) | Formaldehyde (grams) |
|---|---|---|---|---|
| 3a | Tetralin hydroperoxide | 613 | 974 | 858 |
| 3b | α-tetralone | 613 | 974 | 858 |
| 3c | Partial oxidate | 613 | 974 | 858 |
| 3d | do | 1,223 | 650 | 573 |
| 3e | do | 613 | 974 | 925 |

Example 4.—Preparation of a phenolic resin molding powder and molded objects

The polymers prepared as in Examples 1 and 3 above were used as follows: 46 parts of the polymer or modified polymer, 44.6 parts of water-free wood flour, 6.7 parts of hexamethylenetetramine, 2 parts magnesium oxide, and 1 part of the magnesium stearate were ground together until completely mixed. The thermosetting bonding resin mixture obtained thereby was placed in a mold and heated in a press at 160° C. under 2000 p.s.i. for 5 minutes. Unnotched, impact strength tests using an Izod-type impact machine were made on these products (ASTM D 256–56). In Table I are listed the test results on compositions that are illustrative of thermoset resin compositions.

TABLE I.—EFFECT OF MODIFIER ON IMPACT STRENGTHS OF THERMOSET PHENOL-FORMALDEHYDE RESINS

| Polymer tested, Example No.: | Relative impact strength |
|---|---|
| 1 | 1.0 |
| 3a | 1.9 |
| 3b | 3.2 |
| 3c | 5.2–8.4 |
| 3d | Too soft to test |
| 3e | 3.5–3.9 |

In view of the above experimental data, it is notable that:

(1) Both tetralin hydroperoxide-modified and α-tetralone-modified phenol-formaldehyde bonding resins yield thermoset bonded wood products having superior impact strengths.

(2) Mixtures of tetralin hydroperoxide-α-tetralone exhibit substantially greater impact strength improvements as bonding resin modifiers than do the individual modifiers (compare 3c with 3b and 3a). The improvement is not a linear function.

(3) The modifier in relative amount must be a minor portion of the final bonding resin.

As the range of embodiments of this invention is wide, and many may appear to be widely different, yet not depart from the spirit and scope thereof, it is to be understood that this invention is not limited to the specific embodiments thereof, except as defined in the appended claims.

I claim:
1. In the preparation of fusible novolak polymers by the reaction of formaldehyde and phenol in an acidified reaction mixture wherein the mol ratio of formaldehyde to phenol is in the range from about 0.4–0.9, by maintaining said mixture at a temperature in the range from about 50° C. to about the reflux temperature for a period in the range from about 1–5 hours, the improvement which comprises adding to said reaction mixture a modifier selected from the group consisting of tetralin hydroperoxide, α-tetralone, substantially tetralin-free partial oxidates of tetralin, and mixtures thereof, wherein for each part by weight of phenol plus formaldehyde in said mixture from about 0.05 to 0.54 part of said modifier is added, thereby producing an improved phenol-formaldehyde polymer.

2. Process as in claim 1 wherein said modifier is a substantially tetralin-free partial oxidate of tetralin.

3. Process as in claim 1 wherein said modifier is tetralin hydroperoxide.

4. Process as in claim 1 wherein said modifier is α-tetralone.

5. The fusible phenol formaldehyde polymer obtained by the reaction of a mixture consisting essentially of formaldehyde, phenol and a modifier selected from the group consisting of tetralin hydroperoxide, α-tetralone, substantially tetralin-free partial oxidates of tetralin and mixtures thereof, wherein for each mol of phenol in said mixture there is present from about 0.4 to 0.9 mol of formaldehyde and for each part by weight of phenol plus formaldehyde in said mixture from about 0.05 to 0.54 part of said modifier; said reaction being effected by maintaining said mixture for a period from about 1 to 5 hours at a temperature in the range from about 50° C. to about the reflux temperature of said mixture.

6. The composition as in claim 5 wherein said modifier is tetralin hydroperoxide.

7. The composition as in claim 5 wherein said modifier is α-tetralone.

8. The composition of claim 5 wherein said modifier is substantially tetralin-free partial oxidate of tetralin.

9. The composition of claim 5 wherein said partial oxidate is obtained by the liquid phase oxygen or air partial oxidation of tetralin, said oxidation having been carried to a conversion of about 40 percent.

10. The mixture consisting essentially of the composition of claim 5 wherein sufficient hexamethylenetetramine is admixed after said reaction to yield a mixture having a total formaldehyde to phenol mol ratio in the range from about 1.5 to 2.5.

References Cited

UNITED STATES PATENTS 3,244,671 4/1966 Sheppard.
3,281,496 10/1966 Rice et al.

WILLIAM H. SHORT, *Primary Examiner.*
H. SCHAIN, *Assistant Examiner.*